(12) United States Patent
Adcock et al.

(10) Patent No.: US 11,691,738 B2
(45) Date of Patent: Jul. 4, 2023

(54) SPRING-BASED SEAT DIAPHRAGM

(71) Applicant: B/E Aerospace, Inc., Winston-Salem, NC (US)

(72) Inventors: Christopher Adcock, Advance, NC (US); Charles Zurian, Kernersville, NC (US); Dean Sears, Kernersville, NC (US); Daniel I. Udriste, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 165 days.

(21) Appl. No.: 17/121,667

(22) Filed: Dec. 14, 2020

(65) Prior Publication Data

US 2022/0185482 A1 Jun. 16, 2022

(51) Int. Cl.
*B64D 11/06* (2006.01)
*B60N 2/70* (2006.01)

(52) U.S. Cl.
CPC ........ *B64D 11/0647* (2014.12); *B60N 2/7041* (2013.01); *B60N 2/7058* (2013.01)

(58) Field of Classification Search
CPC ...... B60N 2/7094; B60N 2/70; B60N 2/7041; B60N 2/7058; A47C 7/30; B64D 11/0647
See application file for complete search history.

(56) References Cited

U.S. PATENT DOCUMENTS

| 3,556,505 A | 1/1971 | Ohta |
| 4,357,005 A | 11/1982 | Bourke |
| 5,971,432 A | 10/1999 | Gagnon et al. |
| 8,782,835 B2 * | 7/2014 | Pozzi ..................... B64D 11/06 244/118.6 |
| 9,050,919 B2 | 6/2015 | Matsumoto et al. |

(Continued)

FOREIGN PATENT DOCUMENTS

| CN | 104325910 A | 2/2015 |
| DE | 2361010 B2 | 6/1975 |

(Continued)

OTHER PUBLICATIONS

U.S. Appl. No. 17/008,296, filed Aug. 31, 2020, Finlay et al.
Extended Search Report in European Application No. 21214464.6 dated May 10, 2022, 8 pgs.

*Primary Examiner* — Sarah B McPartlin
(74) *Attorney, Agent, or Firm* — Suiter Swantz pc llo

(57) ABSTRACT

A spring-based seat diaphragm may include at least one support diaphragm component. The at least one support diaphragm component may be transversely coupled to the first structural beam and the second structural beam. The spring-based seat diaphragm may include at least one spring. The at least one spring may be proximate to the at least one support diaphragm component. The at least one spring may be parallel to or positioned transverse to the at least one support diaphragm component between the first primary spreader and the second primary spreader. The at least one spring may include a plurality of bends configured to distribute user weight applied to a cushion installed on the aircraft seat over the spring-based seat diaphragm. The spring-based seat diaphragm may be configured to support an aft portion of the cushion. The first structural beam may be configured to support a forward portion of the cushion.

5 Claims, 8 Drawing Sheets

(56) References Cited

U.S. PATENT DOCUMENTS

| | | | |
|---|---|---|---|
| 10,144,515 B2 * | 12/2018 | Le | B60N 2/85 |
| 10,189,570 B2 | 1/2019 | Hames et al. | |
| 10,433,647 B2 | 10/2019 | Jibiki et al. | |
| 10,549,665 B2 | 2/2020 | Nakano et al. | |
| 10,661,905 B2 * | 5/2020 | Schumm | B64D 11/0647 |
| 10,669,030 B1 * | 6/2020 | Morse | B60N 2/66 |
| 2013/0119742 A1 | 5/2013 | Wiegelmann | |
| 2013/0127227 A1 * | 5/2013 | Oleson | B64D 11/06 |
| | | | 297/452.49 |
| 2015/0239380 A1 | 8/2015 | Sugiyama | |
| 2016/0083097 A1 | 3/2016 | Hames et al. | |
| 2016/0280109 A1 | 9/2016 | Ito | |
| 2018/0272906 A1 | 9/2018 | Onuma | |
| 2018/0272909 A1 | 9/2018 | Misono et al. | |
| 2019/0039480 A1 | 2/2019 | Hunt | |
| 2020/0037765 A1 | 2/2020 | Mizoi et al. | |
| 2020/0130847 A1 | 4/2020 | Segura et al. | |

FOREIGN PATENT DOCUMENTS

| | | | |
|---|---|---|---|
| EP | 2743123 B1 | 10/2017 | |
| EP | 3228495 B1 | 6/2020 | |
| JP | 1989001339 B2 | 2/1983 | |
| WO | 1990007731 A1 | 7/1990 | |
| WO | 2014045420 A1 | 3/2014 | |
| WO | 2019035394 A1 | 2/2019 | |

* cited by examiner

SPRING-BASED SEAT DIAPHRAGM

BACKGROUND

Vehicle seats may include components such as a support system mounted within or to a frame, a cushion, and a dress cover. The support system may be fabricated from rigid structures or a fabric. Where the support system is manufactured from a fabric, the fabric may stretch over time which may result in a premature wearing of the vehicle seats. Whether manufactured from rigid structures or a fabric, however, the build of the seat (and any included components within the build) may be required to meet vehicle guidelines and/or standards.

SUMMARY

A spring-based seat diaphragm for an aircraft seat is disclosed, in accordance with one or more embodiments of the disclosure. The spring-based seat diaphragm may include at least one auxiliary spreader. The at least one auxiliary spreader may be transversely coupled to a first structural beam and a second structural beam. The at least one auxiliary spreader may be positioned between a first primary spreader and a second primary spreader. The first primary spreader and the second primary spreader may be parallel to the at least one auxiliary spreader. The first primary spreader and the second primary spreader may be transversely coupled to the first structural beam and the second structural beam. The spring-based seat diaphragm may include at least one spring. The at least one spring may be proximate to the at least one auxiliary spreader. The at least one spring may be parallel to the at least one auxiliary spreader, the at least one spring may be between the first primary spreader and the second primary spreader. The at least one spring may include a plurality of bends configured to distribute user weight applied to a cushion installed on the aircraft seat over the spring-based seat diaphragm. The spring-based seat diaphragm may be configured to support an aft portion of the cushion. The first structural beam may be configured to support a forward portion of the cushion.

In some embodiments, the spring-based seat diaphragm may include a first set of bars and a second set of bars. The first set of bars and the second set of bars may be positioned between the first primary spreader and the second primary spreader. The first set of bars may be transversely coupled to a first end of the at least one auxiliary spreader. The second set of bars may be transversely coupled to a second end of the at least one auxiliary spreader. The first set of bars and the second set of bars may be configured to secure the at least one spring within the spring-based seat diaphragm.

In some embodiments, the first set of bars may include an upper bar and a lower bar. A first bend of the plurality of bends at a first end of the at least one spring may be configured to fit within a space between the upper bar and the lower bar of the first set of bars. The second set of bars may include an upper bar and a lower bar. A second bend of the plurality of bends at a second end of the at least one spring may be configured to fit within a space between the upper bar and the lower bar of the second set of bars.

In some embodiments, the at least one auxiliary spreader may be configured to couple to each of the first structural beam and the second structural beam via an interference coupler.

In some embodiments, the spring-based seat diaphragm may further include a set of bars. The set of bars may be positioned between the first primary spreader and the second primary spreader. The set of bars may be transversely coupled to a first end of the at least one auxiliary spreader. The spring-based seat diaphragm may further include an auxiliary beam. The auxiliary beam may be positioned between the first primary spreader and the second primary spreader. The auxiliary beam may be transversely coupled to a second end of the at least one auxiliary spreader. The auxiliary beam and the set of bars may be configured to secure the at least one spring within the spring-based seat diaphragm.

In some embodiments, the set of bars may include an upper bar and a lower bar. A first bend of the plurality of bends at a first end of the at least one spring may be configured to fit within a space between the upper bar and the lower bar of the set of bars. A second bend of the plurality of bends at a second end of the at least one spring may be configured to wrap around the auxiliary beam.

In some embodiments, the at least one auxiliary spreader may be configured to engage the first structural beam via a non-interference coupler. The at least one auxiliary spreader may be configured to couple to the second structural beam via a bracket.

In some embodiments, the spring-based seat diaphragm may further include a first set of cut-outs within a first end of the at least one auxiliary spreader. The spring-based seat diaphragm may include a second set of cut-outs within a second end of the at least one auxiliary spreader. A first bend of the plurality of bends of the at least one spring may be configured to be inserted within the first set of cut-outs. A second bend of the plurality of bends of the at least one spring may be configured to be inserted within the second set of cut-outs. The first set of cut-outs and the second set of cut-outs may be configured to secure the at least one spring within the spring-based seat diaphragm.

In some embodiments, the at least one auxiliary spreader may be configured to couple to each of the first structural beam and the second structural beam via an interference coupler.

A spring-based seat diaphragm for an aircraft seat is disclosed, in accordance with one or more embodiments of the disclosure. The spring-based seat diaphragm may include at least one support diaphragm component. The at least one support diaphragm component may be transversely coupled to a first structural beam and a second structural beam. The spring-based seat diaphragm may include at least one spring. The at least one spring may be proximate to the at least one support diaphragm component. The at least one spring may be positioned transverse to the at least one support diaphragm component between a first primary spreader and a second primary spreader. The at least one spring may include a plurality of bends configured to distribute user weight applied to a cushion installed on the aircraft seat over the spring-based seat diaphragm. The spring-based seat diaphragm may be configured to support an aft portion of the cushion. The first structural beam may be configured to support a forward portion of the cushion.

In some embodiments, the at least one support diaphragm component may include a first auxiliary beam and a second auxiliary beam. The first auxiliary beam and the second auxiliary beam may be parallel to the first structural beam and the second structural beam. A first end of the at least one spring may be coupled to the first auxiliary beam and a second end of the at least one spring may be coupled to the second auxiliary beam. The coupling of the first end of the at least one spring to the first auxiliary beam and the coupling of the second end of the at least one spring to the second auxiliary beam may be configured to secure the at least one spring within the spring-based seat diaphragm. Each bend of the plurality of bends may increase in length in a progression from the first auxiliary beam to the second auxiliary beam.

In some embodiments, the at least one support diaphragm component may include a first auxiliary beam and a second auxiliary beam. The first auxiliary beam and the second auxiliary beam may be parallel to the first structural beam and the second structural beam. The at least one support diaphragm component may further include a first set of bars. The first set of bars may be positioned between the first primary spreader and the second primary spreader. The first set of bars being transversely coupled to the first auxiliary beam. The at least one support diaphragm component may further include a second set of bars. The second set of bars may be positioned between the first primary spreader and the second primary spreader. The second set of bars may be transversely coupled to a second end of the second auxiliary beam. The first set of bars and the second set of bars may be configured to secure the at least one spring within the spring-based seat diaphragm.

In some embodiments, the first set of bars may include an upper bar and a lower bar. A first bend of the plurality of bends at the first end of the at least one spring may be configured to fit within a space between the upper bar and the lower bar of the first set of bars. The second set of bars may include an upper bar and a lower bar. A second bend of the plurality of bends at the second end of the at least one spring may be configured to fit within a space between the upper bar and the lower bar of the second set of bars.

In some embodiments, the at least one spring may include at least two springs. Each of the at least two springs may include a first end and a second end. The at least one support diaphragm component may include a first lower bracket and a first upper bracket. A first bend of the plurality of bends at the first end of each of the at least two springs may be configured to fit within a space between the first lower bracket and the first upper bracket. The at least one support diaphragm component may further include a second lower bracket and a second upper bracket. A second bend of the plurality of bends at the second end of each of the at least two springs may be configured to fit within a space between the second lower bracket and the second upper bracket. The first lower bracket, the first upper bracket, the second lower bracket, and the second upper bracket may be configured to secure the at least one spring within the spring-based seat diaphragm. A first spring of the at least two springs may be in a first plane. A second spring of the at least two springs may be in a second plane. The first plane may intersect with the second plane.

In some embodiments, the at least one spring may include at least two springs. Each of the at least two springs may include a first end and a second end. The at least one support diaphragm component may include a first bracket. A first bend of the plurality of bends at the first end of each of the at least two springs may be configured to engage the first bracket at an attachment point on the first bracket. The at least one support diaphragm component may include a second bracket. A second bend of the plurality of bends at the second end of each of the at least two springs may be configured to engage the second bracket at an attachment point on the second bracket. A first spring of the at least two springs may be in a first plane. A second spring of the at least two springs may be in a second plane. The first plane intersecting with the second plane.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
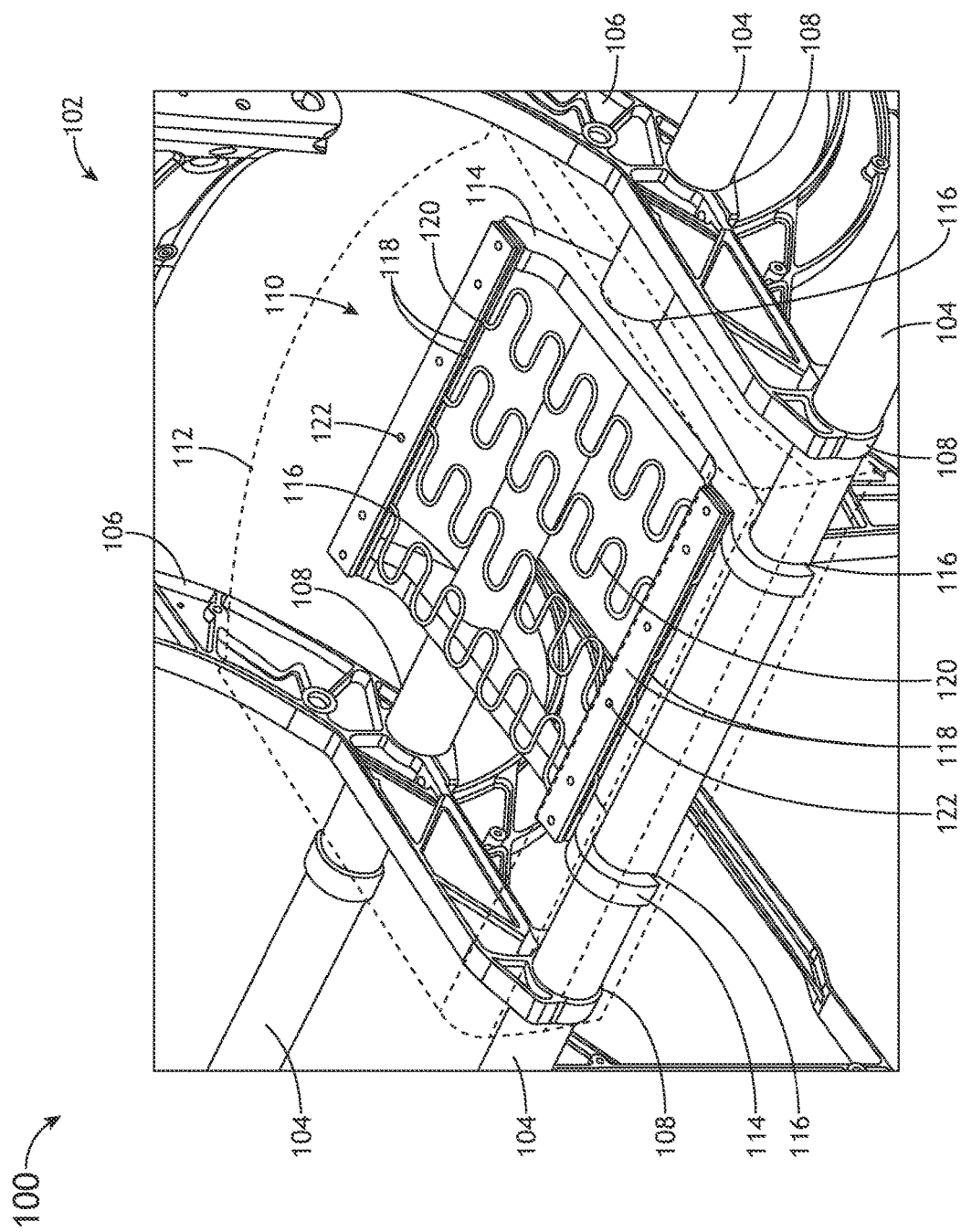
FIG. 1 illustrates a perspective view of portions of an aircraft seat including a spring-based seat diaphragm, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-8 generally illustrate a spring-based seat diaphragm, in accordance with one or more embodiments of the disclosure.

Vehicle seats may include components such as a dress cover, a cushion, and a support system mounted to and/or positioned within a frame. The support system may be fabricated from rigid structures or a fabric. Where the support system is manufactured from a fabric, the fabric may stretch over time which may result in a premature wearing of the vehicle seats. The fabric-based support system may require difficult stretching, as well as special tooling to assist in the stretching and installation.

Whether manufactured from rigid structures or a fabric, however, the build of the seat (and any included components within the build) may be required to meet vehicle guidelines and/or standards. For example, where the vehicle seat is an aircraft seat, the aircraft seat may be required to meet aviation guidelines and/or standards. For instance, the aircraft seat may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be desirable to create a spring-based seat diaphragm. The spring-based seat diaphragm should include off-the-shelf springs, include springs fabricated from off-the-shelf spring material, or include custom-made/purpose-built springs. The spring-based seat diaphragm should support the cushion, in addition to portions of the frame supporting the cushion. The spring-based seat diaphragm should be mounted to and/or positioned within the frame in an aft-most part of the vehicle seat, the aft-most part of the vehicle seat being a location selected to improve comfort and longevity of the vehicle seat through user weight distribution. Where the vehicle seat is an aircraft seat, the spring-based seat diaphragm should be configured in accordance with aviation guidelines and/or standards.

Referring in general to FIGS. 1-8, a spring-based seat diaphragm may be integrated within an aircraft seat installed within an aircraft cabin 100.

The aircraft cabin 100 may include one or more aircraft seats 102. For example, the one or more aircraft seats 102 may include, but is not limited to, a seat pan, a seat back, or the like. The one or more aircraft seats 102 may include, but is not limited to, a business class or first-class passenger seat, an economy-class passenger seat, or the like. It is noted herein the terms "aircraft seats" and "passenger seats" may be considered equivalent, for purposes of the disclosure.

An aircraft seat 102 of the one or more aircraft seats 102 may be rotatable about an axis (e.g., swivelable). The aircraft seat 102 may be fully positionable between the outer limits of motion as defined by the moveable components of the aircraft seat 102. Where the aircraft seat 102 is installed within a passenger compartment, the aircraft seat 102 may be fully positionable between the outer limits of motion as defined by one or more passenger compartment monuments of the passenger compartment. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 102 may be actuatable (e.g., translatable and/or rotatable) from the TTOL position to a non-TTOL position, and/or vice versa. Further, it is noted herein the aircraft seat 102 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

In general, an aircraft seat 102 may be translatable (e.g., trackable or slidable). The aircraft seat 102 may be rotatable about an axis cross-wise through the aircraft seat 102 into a position including, but not limited to, the upright or raised position, one or more lounge or reclined positions, and a lie-flat or bed position. For example, the aircraft seat 102 may transition directly between the upright or raised position and the lie-flat or bed position. By way of another example, it is noted herein the aircraft seat 102 may transition through one or more lounge or reclined positions between the upright or raised position and the lie-flat or bed position. By way of another example, the aircraft seat 102 may transition into one or more lounge or reclined positions in a motion separate from the transition between the upright or raised position and the lie-flat or bed position. Therefore, the above description should not be interpreted as a limitation on the scope of the disclosure but merely an illustration.

The one or more aircraft seats 102 may be independently-positioned within the aircraft cabin 100. The one or more aircraft seats 102 may be coupled together via one or more frames or frame elements such as structural beams 104. For example, the one or more aircraft seats 102 may be within a row of aircraft seats 102 coupled to a set of structural beams 104, where select aircraft seat 102 components may be shared with other aircraft seats 102. For instance, some frame elements may be shared between adjacent aircraft seats 102 while other frame elements may be common across an entire row of aircraft seats 102. In addition, the one or more aircraft seats 102 may be part of a two-seat, three-seat, four-seat, or five or more-seat row.

Where there are multiple structural beams 104, the multiple structural beams 104 may be positioned in a parallel (or substantially parallel) spaced-apart relationship. In addition, where there are multiple structural beams 104, a particular structural beam 104 may correspond to a respective "forward/fore" or "aft/rear" structural beam 104. It is noted herein, however, the relationship between the multiple structural beams 104 is not limited to parallel (or substantially parallel), and the arrangement of the multiple structural beams 104 is not limited to respective "forward/fore" and "aft/rear" designations. Therefore, the above description should not be interpreted as a limitation on the present disclosure but merely an illustration.

It is noted herein legs may attach to the one or more structural beams 104 and secure to embedded seat tracks located in a floor of the aircraft cabin 100 via conventional track fasteners. In addition, it is noted herein additional components may couple to and/or be integrated into the one or more aircraft seats 102 including, but not limited to, pivoting armrests, seatbelts, tray table support arms, or the like.

The aircraft seat 102 may be coupled to the one or more structural beams 104 via one or more main or primary spreaders 106. Where there are multiple primary spreaders 106, the multiple primary spreaders 106 may be positioned in a parallel (or substantially parallel) spaced-apart relationship. In addition, where there are multiple primary spreaders 106, a particular primary spreader 106 may correspond to a respective "inboard" or "outboard" primary spreader 106. The one or more primary spreaders 106 may be transverse (e.g., perpendicular (or substantially perpendicular)) to the one or more structural beams 104. It is noted herein, however, the relationship between the multiple primary spreaders 106 is not limited to parallel (or substantially parallel), the arrangement of the multiple primary spreaders 106 is not limited to respective "inboard" and "outboard" designations, and the relationship between the one or more primary spreaders 106 and the one or more structural beams 104 is not limited to transverse (e.g., perpendicular (or substantially perpendicular)). Therefore, the above description should not be interpreted as a limitation on the present disclosure but merely an illustration.

The one or more primary spreaders 106 may be coupled to the one or more structural beams 104 via one or more brackets 108. For example, the one or more brackets 108 may be fabricated on the one or more primary spreaders 106. By way of another example, the one or more brackets 108 may be coupled to the one or more primary spreaders 106.

Although embodiments of the disclosure illustrate the use of the one or more brackets 108 to couple the one or more primary spreaders 106 to the one or more structural beams 104, it is noted herein the one or more primary spreaders 106 may be coupled to the one or more structural beams 104 via one or more interference couplers. For example, a particular interference coupler may be capable of a select amount of deflection, allowing the interference coupler to snap or otherwise latch onto a corresponding structural beam 104. It is noted herein the one or more interference couplers may be hemispherical or hyper-hemispherical, to allow for the retaining of the one or more primary spreaders 106 on the one or more structural beams 104. In addition, it is noted herein a diameter of the one or more interference couplers may be equal to or less than a diameter of the one or more structural beams 104, to allow for the retaining of the one or more primary spreaders 106 on the one or more structural beams 104. In addition, it is noted herein the one or more primary spreaders 106 may be coupled to the one or more structural beams 104 via one or more non-interference couplers. Further, it is noted herein the one or more primary spreaders 106 may be coupled to the one or more structural beams 104 via one or more fasteners. Further, it is noted herein the one or more primary spreaders 106 may be coupled to the one or more structural beams 104 via a combination of the one or more brackets 108, the one or more interference couplers, the one or more non-interference couplers, and/or the one or more fasteners. Therefore, the above description should not be interpreted as a limitation on the scope of the disclosure but merely an illustration.

The aircraft seat 102 may include a sub-structure or support system. The support system may be a rigid structure within the aircraft seat 102, such that the support system does not move. The support system may include one or more movable components such that the support system may articulate. For example, the support system may articulate when the aircraft seat 102 actuates between the upright or raised position, the one or more lounge or reclined positions, and/or the lie-flat or bed position.

The support system may include a spring-based seat diaphragm 110. For example, the spring-based seat diaphragm 110 may include, a plastic diaphragm, a metal diaphragm, a wire or wireframe diaphragm, or the like. It is noted herein "spring-based seat diaphragm" and variants including, but not limited to, "diaphragm" may be considered equivalent, for purposes of the disclosure.

The diaphragm 110 may be mounted to the one or more structural beams 104 and/or positioned within the one or more primary spreaders 106. For example, the diaphragm 110 may include, but is not limited to, a seat pan diaphragm, a seat back diaphragm, or the like.

The aircraft seat 102 may include a cushion 112. For example, the cushion 112 may include, but is not limited to, a seat pan cushion, a seat back cushion, or the like. The cushion 112 may conform or substantially conform to the support system. For example, at least one surface of the cushion 112 may conform to a corresponding surface of the support system. By way of another example, components of the support system may extend beyond the boundaries of the cushion 112, such that the at least one surface of the cushion 112 does not fully conform to the corresponding surface of the support system. By way of another example, a portion of the cushion 112 may wrap around or otherwise enclose a portion of the support system (e.g., including, but not limited to, a front edge or leading portion of the cushion 112). In general, the support system may conform to a portion of a user (e.g., a passenger, a crew member, or the like), and the cushion 112 may similarly conform to the portion of the user due to the cushion 112 conforming to the support system.

The cushion 112 may be attached to one or more components of the aircraft seat 102. For example, the one or more components may include, but are not limited to, the diaphragm 110. By way of another example, the cushion 112 and the one or more components of the aircraft seat 102 may be coupled with hook and loop fastener assemblies (e.g., Velcro®) or other fastener assemblies (e.g., attachment clips, or the like).

Additional systems and methods for attaching the cushion 112 to components of the aircraft seat 102 including, but not limited to, the diaphragm 110 are discussed in U.S. patent application Ser. No. 17/008,296, titled ATTACHMENT ASSEMBLY FOR A DRESS COVER AND CUSHION OF AN AIRCRAFT SEAT, filed Aug. 31, 2020, which is incorporated herein in the entirety.

The diaphragm 110 may support the cushion 112. For example, the cushion 112 may be supported by the diaphragm 110 and at least some of the one or more structural beams 104. For instance, the diaphragm 110 may be positioned within the one or more primary spreaders 106 and configured to support an aft portion of the cushion 112, while a fore location of the cushion 112 may be supported by a fore structural beam 104. By way of another example, the cushion 112 may be supported by the diaphragm 110, at least some of the one or more structural beams 104, and at least some of the one or more primary spreaders 106. In this regard, the cushion 112 may be arranged in a hybrid setup that is supported by both the diaphragm 110 and portions of the structural beams 104 and/or portions of the one or more primary spreaders 106.

Although embodiments of the disclosure illustrate the cushion 112 being supported by the diaphragm 110 and portions of the structural beams 104 and/or portions of the one or more primary spreaders 106, it is noted herein the cushion 112 may be supported solely by the diaphragm 110. Therefore, the above description should not be interpreted as a limitation on the present disclosure but merely an illustration.

It is noted herein mounting the diaphragm 110 to and/or positioning the diaphragm 110 in the aft-most part of the aircraft seat 102 may allow for a distribution of user weight, leading to improved comfort and longevity of the aircraft seat 102. In addition, mounting the diaphragm 110 to and/or positioning the diaphragm 110 may allow for a reduction in a thickness of the cushion 112, as the diaphragm 110 provides additional levels of comfort traditionally provided by a cushion 112 of an increased thickness.

FIGS. 1-7 in general illustrate example embodiments of the diaphragm 110 within the aircraft seat 102, in accordance with one or more embodiments of the disclosure. In general, the diaphragm 110 may be positioned within the aircraft seat 102 at a location where spring-based support is provided at the aft end of the cushion 112, the aft end being a location of the cushion 112 where user weight is localized (or at least favored), such that the user weight may be better distributed by the diaphragm 110.

Referring now to an example embodiment illustrated in FIG. 1, the diaphragm 110 may include one or more mini-spreaders or auxiliary spreaders 114. Where there are multiple auxiliary spreaders 114, the multiple auxiliary spreaders 114 may be positioned in a parallel (or substantially parallel) spaced-apart relationship. In addition, where there are multiple auxiliary spreaders 114, a particular auxiliary spreader 114 may correspond to a respective "inboard" or "outboard" auxiliary spreader 114. The one or more auxiliary spreaders 114 may be transverse (e.g., perpendicular (or substantially perpendicular)) to the one or more structural beams 104. It is noted herein, however, the relationship between the multiple auxiliary spreaders 114 is not limited to parallel (or substantially parallel), the arrangement of the multiple auxiliary spreaders 114 is not limited to respective "inboard" and "outboard" designations, and the relationship between the one or more auxiliary spreaders 114 and the one or more structural beams 104 is not limited to transverse (e.g., perpendicular (or substantially perpendicular)). Therefore, the above description should not be interpreted as a limitation on the present disclosure but merely an illustration.

The one or more auxiliary spreaders 114 may be coupled to the one or more structural beams 104 via one or more interference couplers 116. For instance, a particular interference coupler 116 may be capable of a select amount of deflection, allowing the interference coupler 116 to snap or otherwise latch onto a corresponding structural beam 104. It is noted herein the one or more interference couplers 116 may be hemispherical or hyper-hemispherical, to allow for the retaining of the one or more auxiliary spreaders 114 on the one or more structural beams 104. In addition, it is noted herein a diameter of the one or more interference couplers 116 may be equal to or less than a diameter of the one or more structural beams 104, to allow for the retaining of the one or more auxiliary spreaders 114 on the one or more structural beams 104.

Although embodiments of the disclosure illustrate the use of the one or more interference couplers 116 to couple the one or more auxiliary spreaders 114 to the one or more structural beams 104, it is noted herein the one or more auxiliary spreaders 114 may be coupled to the one or more structural beams 104 via one or more non-interference couplers. In addition, it is noted herein the one or more auxiliary spreaders 114 may be coupled to the one or more structural beams 104 via one or more brackets. For example, the one or more brackets may be fabricated on the one or more auxiliary spreaders 114. By way of another example, the one or more brackets may be coupled to the one or more auxiliary spreaders 114. Further, it is noted herein the one or more auxiliary spreaders 114 may be coupled to the one or more structural beams 104 via one or more fasteners or an adhesive. Further, it is noted herein the one or more auxiliary spreaders 114 may be coupled to the one or more structural beams 104 via one or more fabrication processes (e.g., welding processes, or the like). Further, it is noted herein the one or more auxiliary spreaders 114 may be coupled to the one or more structural beams 104 via a combination of the one or more interference couplers 116, the one or more non-interference couplers, the one or more brackets, the one or more fasteners or an adhesive, and/or the one or more fabrication processes. Therefore, the above description should not be interpreted as a limitation on the scope of the disclosure but merely an illustration.

The diaphragm 110 may include one or more sets of bars 118. For example, the one or more sets of bars 118 may be coupled to the one or more auxiliary spreaders 114, as opposed to attaching directly to the one or more primary spreaders 106. Where there are multiple sets of bars 118, the sets of bars 118 may be positioned in a parallel (or substantially parallel) spaced-apart relationship. In addition, where there are multiple sets of bars 118, a particular set of bars 118 may correspond to a respective "forward/fore" or "aft/rear" set of bars 118. The one or more set of bars 118 may be transverse (e.g., perpendicular (or substantially perpendicular)) to the one or more auxiliary spreaders 114. It is noted herein, however, the relationship between the multiple set of bars 118 is not limited to parallel (or substantially parallel), the arrangement of the multiple set of bars 118 is not limited to respective "forward/fore" or "aft/rear" designations, and the relationship between the one or more sets of bars 118 and the one or more auxiliary spreaders 114 is not limited to transverse (e.g., perpendicular (or substantially perpendicular)). Therefore, the above description should not be interpreted as a limitation on the present disclosure but merely an illustration.

The diaphragm 110 may include one or more springs 120. A particular spring 120 may be held in place within the diaphragm 110 by being secured by the one or more sets of bars 118. For example, the particular spring 120 may be held in place within the diaphragm 110 by being secured between an upper bar 118 and a lower bar 118 of a particular set of bars 118. By way of another example, the particular spring 120 may be held in place via one or more fasteners 122, either in addition to or instead of the one or more sets of bars 118. For example, a fastener 122 may engage the upper bar 118 and the lower bar 118, and a coil or bend of a particular spring 120 may at least partially wrap around the fastener 122 in the gap between the upper bar 118 and the lower bar 118. It is noted herein, however, the coil or bend of the particular spring 120 may not need to wrap around the fastener 122, where the upper bar 118 and the lower bar 118 are secured tightly enough to pinch the spring 120 and not allow the spring 120 to move within the diaphragm 110. In addition, it is noted herein the one or more springs 120 may be coupled to one or more sets of bars 118 via an adhesive, one or more fabrication processes (e.g., welding processes, or the like), and/or one or more interlocking assemblies (e.g., hook and loop fastener assemblies, tab and groove assemblies, or the like). In this regard, the one or more springs 120 are stretched between the one or more sets of bars 118.

It is noted herein the one or more springs 120 may include off-the-shelf springs, include springs fabricated from off-the-shelf spring material, or include custom-made/purpose-built springs. Where the one or more springs 120 are custom-made/purpose-built springs, the one or more springs 120 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like.

It is noted herein components including, but not limited to, the one or more auxiliary spreaders 114, the one or more sets of bars 118, and the one or more springs 120 may each be considered support diaphragm components, for purposes of the disclosure.

Figure 2:
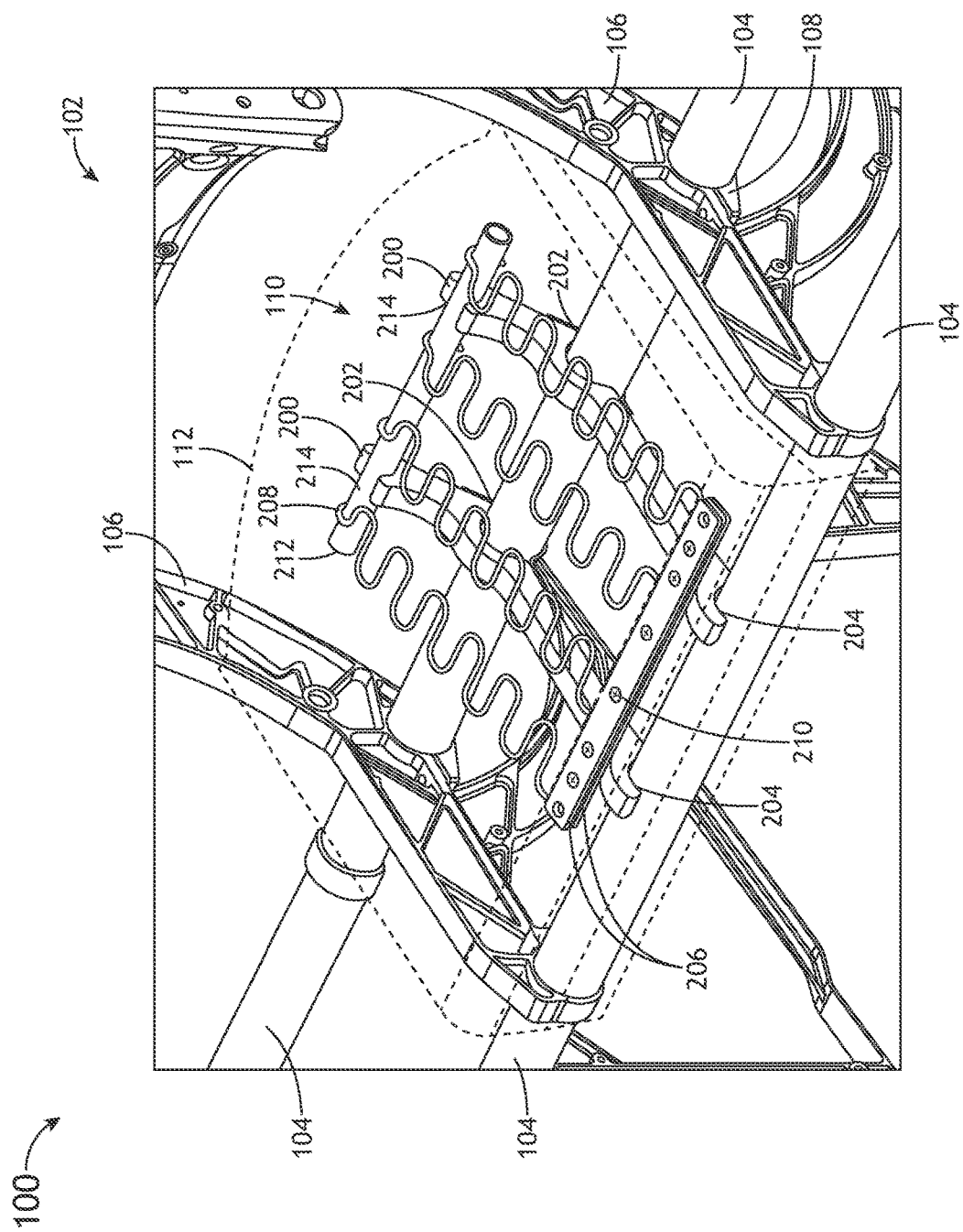
FIG. 2 illustrates a perspective view of portions of an aircraft seat including a spring-based seat diaphragm, in accordance with one or more embodiments of the disclosure.

Referring now to an example embodiment illustrated in FIG. 2, the diaphragm 110 may include one or more mini-spreaders or auxiliary spreaders 200. Where there are multiple auxiliary spreaders 200, the multiple auxiliary spreaders 200 may be positioned in a parallel (or substantially parallel) spaced-apart relationship. In addition, where there are multiple auxiliary spreaders 200, a particular auxiliary spreader 200 may correspond to a respective "inboard" or "outboard" auxiliary spreader 200. The one or more auxiliary spreaders 200 may be transverse (e.g., perpendicular (or substantially perpendicular)) to the one or more structural beams 104. It is noted herein, however, the relationship between the multiple auxiliary spreaders 200 is not limited to parallel (or substantially parallel), the arrangement of the multiple auxiliary spreaders 200 is not limited to respective "inboard" and "outboard" designations, and the relationship between the one or more auxiliary spreaders 200 and the one or more structural beams 104 is not limited to transverse (e.g., perpendicular (or substantially perpendicular)). Therefore, the above description should not be interpreted as a limitation on the present disclosure but merely an illustration.

The one or more auxiliary spreaders 114 may be coupled to the one or more structural beams 104 via one or more brackets 202. For instance, the one or more brackets 202 may be fabricated on the one or more auxiliary spreaders 200. In addition, the one or more brackets 202 may be coupled to the one or more auxiliary spreaders 200. By way of another example, the one or more auxiliary spreaders 114 may be coupled to the one or more structural beams 104 via one or more non-interference couplers 204. For instance, the one or more non-interference couplers 204 may rest on or partially wrap around a particular structural beam 104. For instance, the particular structural beam 104 may be a fore structural beam 104.

Although embodiments of the disclosure illustrate the use of the one or more brackets 202 and/or one or more non-interference couplers 204 to couple the one or more auxiliary spreaders 200 to the one or more structural beams 104, it is noted herein the one or more primary spreaders 106 may be coupled to the one or more structural beams 104 via one or more interference couplers. For instance, a particular interference coupler may be capable of a select amount of deflection, allowing the interference coupler to snap or otherwise latch onto a corresponding structural beam 104. It is noted herein the one or more interference couplers may be hemispherical or hyper-hemispherical, to allow for the retaining of the one or more auxiliary spreaders 200 on the one or more structural beams 104. In addition, it is noted herein a diameter of the one or more interference couplers may be equal to or less than a diameter of the one or more structural beams 104, to allow for the retaining of the one or more auxiliary spreaders 200 on the one or more structural beams 104. In addition, it is noted herein the one or more auxiliary spreaders 200 may be coupled to the one or more structural beams 104 via one or more fasteners. Further, it is noted herein the one or more auxiliary spreaders 200 may be coupled to the one or more structural beams 104 via a combination of the one or more brackets 202, the one or more non-interference couplers 204, the one or more interference couplers, and/or the one or more fasteners. Therefore, the above description should not be interpreted as a limitation on the scope of the disclosure but merely an illustration.

The diaphragm 110 may include one or more sets of bars 206. For example, the one or more sets of bars 206 may be coupled to the one or more auxiliary spreaders 200, as opposed to attaching directly to the one or more primary spreaders 106. Where there are multiple sets of bars 206, the sets of bars 206 may be positioned in a parallel (or substantially parallel) spaced-apart relationship. In addition, where there are multiple sets of bars 206, a particular set of bars 206 may correspond to a respective "forward/fore" or "aft/rear" set of bars 206. The one or more set of bars 206 may be transverse (e.g., perpendicular (or substantially perpendicular)) to the one or more auxiliary spreaders 200. It is noted herein, however, the relationship between the multiple set of bars 206 is not limited to parallel (or substantially parallel), the arrangement of the multiple set of bars 206 is not limited to respective "forward/fore" or "aft/rear" designations, and the relationship between the one or more set of bars 206 and the one or more auxiliary spreaders 200 is not limited to transverse (e.g., perpendicular (or substantially perpendicular)). Therefore, the above description should not be interpreted as a limitation on the present disclosure but merely an illustration.

The diaphragm 110 may include one or more springs 208. A particular spring 208 may be held in place within the diaphragm 110 by being secured by the one or more sets of bars 206. For example, the particular spring 208 may be held in place within the diaphragm 110 by being secured between an upper bar 206 and a lower bar 206 of a particular set of bars 206. By way of another example, the particular spring 208 may be held in place via one or more fasteners 210, either in addition to or instead of the one or more sets of bars 206. For example, a fastener 210 may engage the upper bar 206 and the lower bar 206, and a coil or bend of a particular spring 208 may at least partially wrap around the fastener 210 in the gap between the upper bar 206 and the lower bar 206. It is noted herein, however, the coil or bend of the particular spring 208 may not need to wrap around the fastener 210, where the upper bar 206 and the lower bar 206 are secured tightly enough to pinch the spring 208 and not allow the spring 208 to move within the diaphragm 110.

The diaphragm 110 may include one or more auxiliary beams 212. The one or more auxiliary spreaders 200 may receive the one or more auxiliary beams 212. For example, the one or more auxiliary beams 212 may include one or more interference couplers 214 configured to receive the one or more auxiliary beams 212. For instance, a particular interference coupler 214 may be capable of a select amount of deflection, allowing the interference coupler 214 to snap or otherwise latch onto a corresponding auxiliary beam 212. It is noted herein the one or more interference couplers 214 may be hemispherical or hyper-hemispherical, to allow for the retaining of the one or more auxiliary spreaders 114 on the one or more auxiliary beams 212. In addition, it is noted herein a diameter of the one or more interference couplers 214 may be equal to or less than a diameter of the one or more auxiliary beams 212, to allow for the retaining of the one or more auxiliary spreaders 114 on the one or more auxiliary beams 212.

Although embodiments of the disclosure illustrate the use of the one or more the one or more interference couplers 214 to couple the one or more auxiliary spreaders 200 to the one or more auxiliary beams 212, it is noted herein the one or more auxiliary spreaders 200 may be coupled to the one or more auxiliary beams 212 via one or more non-interference couplers. In addition, it is noted herein the one or more auxiliary spreaders 200 may be coupled to the one or more auxiliary beams 212 via one or more brackets. For example, the one or more brackets may be fabricated on the one or more auxiliary spreaders 200. By way of another example, the one or more brackets may be coupled to the one or more auxiliary spreaders 200. Further, it is noted herein the one or more auxiliary spreaders 200 may be coupled to the one or more auxiliary beams 212 via one or more fasteners or an adhesive. Further, it is noted herein the one or more auxiliary spreaders 200 may be coupled to the one or more structural beams 104 via one or more fabrication processes (e.g., welding processes, or the like). Further, it is noted herein the one or more auxiliary spreaders 200 may be coupled to the one or more auxiliary beams 212 via a combination of the one or more interference couplers 214, the one or more non-interference couplers, the one or more brackets, and/or the one or more fasteners or an adhesive, and/or the one or more fabrication processes. Therefore, the above description should not be interpreted as a limitation on the scope of the disclosure but merely an illustration.

The one or more springs 208 may be coupled to the one or more auxiliary beams 212. For example, a coil or bend of a particular spring 208 may wrap around the one or more auxiliary beams 212. By way of another example, the one or more springs 208 may be coupled to the one or more auxiliary beams 212 via one or more fasteners or an adhesive, one or more fabrication processes (e.g., welding processes, or the like), and/or one or more interlocking assemblies (e.g., hook and loop fastener assemblies, tab and groove assemblies, or the like). In this regard, the one or more springs 208 are stretched between the one or more sets of bars 206 and the one or more auxiliary beams 212.

It is noted herein the one or more springs 208 may include off-the-shelf springs, include springs fabricated from off-the-shelf spring material, or include custom-made/purpose-built springs. Where the one or more springs 208 are custom-made/purpose-built springs, the one or more springs 208 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like.

It is noted herein components including, but not limited to, the one or more auxiliary spreaders 200, the one or more sets of bars 206, the one or more springs 208, and the one or more auxiliary beams 212 may each be considered support diaphragm components, for purposes of the disclosure.

Figure 3:
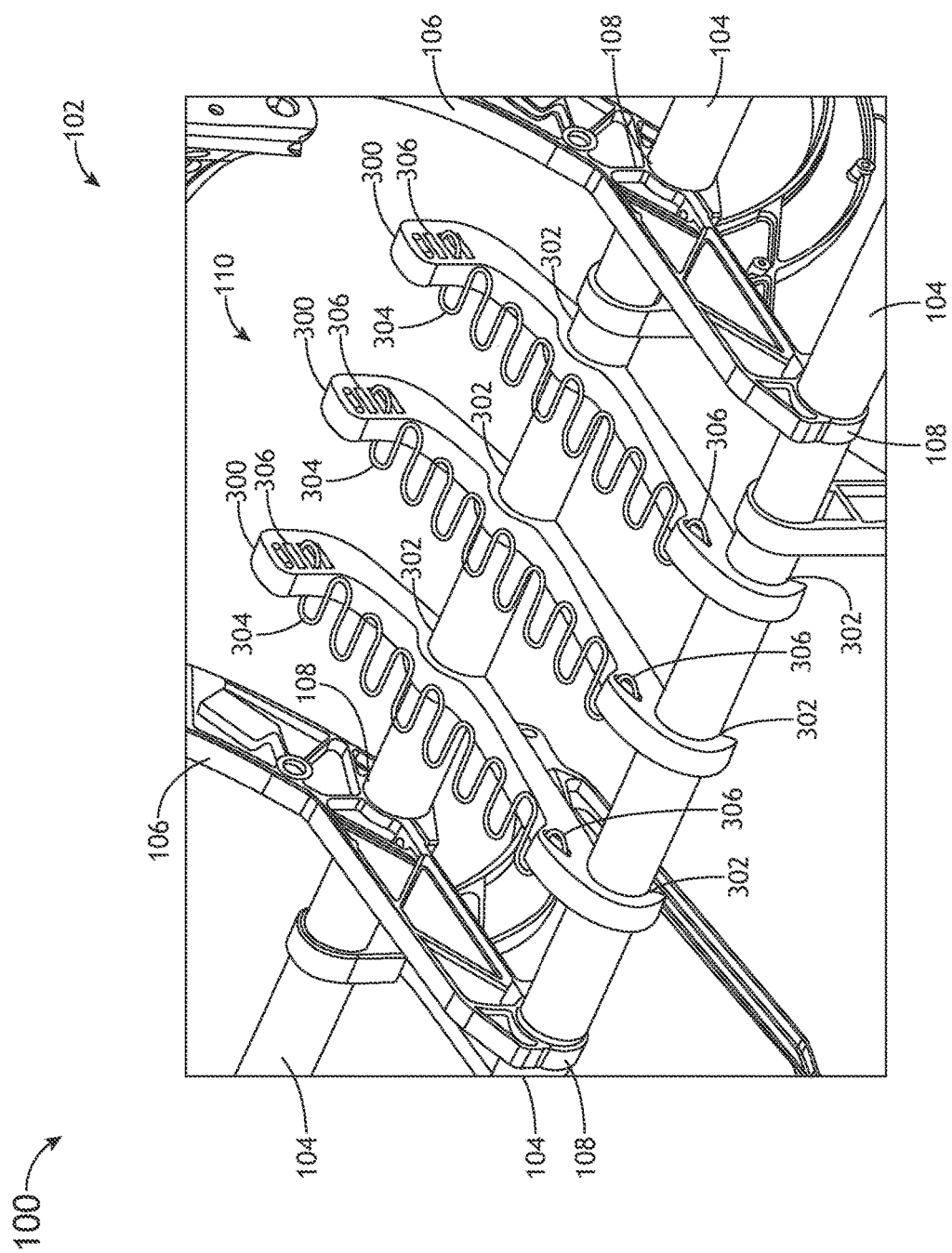
FIG. 3 illustrates a perspective view of portions of an aircraft seat including a spring-based seat diaphragm, in accordance with one or more embodiments of the disclosure.

Referring now to an example embodiment illustrated in FIG. 3, the diaphragm 110 may include one or more mini-spreaders or auxiliary spreaders 300. Where there are multiple auxiliary spreaders 300, the multiple auxiliary spreaders 300 may be positioned in a parallel (or substantially parallel) spaced-apart relationship. In addition, where there are multiple auxiliary spreaders 300, a particular auxiliary spreader 300 may correspond to a respective "inboard" or "outboard" auxiliary spreader 300. The one or more auxiliary spreaders 300 may be transverse (e.g., perpendicular (or substantially perpendicular)) to the one or more structural beams 104. It is noted herein, however, the relationship between the multiple auxiliary spreaders 300 is not limited to parallel (or substantially parallel), the arrangement of the multiple auxiliary spreaders 300 is not limited to respective "inboard" and "outboard" designations, and the relationship between the one or more auxiliary spreaders 300 and the one or more structural beams 104 is not limited to transverse (e.g., perpendicular (or substantially perpendicular)). Therefore, the above description should not be interpreted as a limitation on the present disclosure but merely an illustration.

The one or more auxiliary spreaders 300 may be coupled to the one or more structural beams 104 via one or more interference couplers 302. For instance, a particular interference coupler 302 may be capable of a select amount of deflection, allowing the interference coupler 302 to snap or otherwise latch onto a corresponding structural beam 104. It is noted herein the one or more interference couplers 302 may be hemispherical or hyper-hemispherical, to allow for the retaining of the one or more auxiliary spreaders 300 on the one or more structural beams 104. In addition, it is noted herein a diameter of the one or more interference couplers 302 may be equal to or less than a diameter of the one or more structural beams 104, to allow for the retaining of the one or more auxiliary spreaders 300 on the one or more structural beams 104.

Although embodiments of the disclosure illustrate the use of the one or more interference couplers 302 to couple the one or more auxiliary spreaders 300 to the one or more structural beams 104, it is noted herein the one or more auxiliary spreaders 300 may be coupled to the one or more structural beams 104 via one or more non-interference couplers. In addition, it is noted herein the one or more auxiliary spreaders 300 may be coupled to the one or more structural beams 104 via one or more brackets. For example, the one or more brackets may be fabricated on the one or more auxiliary spreaders 300. By way of another example, the one or more brackets may be coupled to the one or more auxiliary spreaders 300. Further, it is noted herein the one or more auxiliary spreaders 300 may be coupled to the one or more structural beams 104 via one or more fasteners or an adhesive. Further, it is noted herein the one or more auxiliary spreaders 300 may be coupled to the one or more structural beams 104 via one or more fabrication processes (e.g., welding processes, or the like). Further, it is noted herein the one or more auxiliary spreaders 300 may be coupled to the one or more structural beams 104 via a combination of the one or more interference couplers 302, the one or more non-interference couplers, the one or more brackets, and/or the one or more fasteners or an adhesive, and/or the one or more fabrication processes. Therefore, the above description should not be interpreted as a limitation on the scope of the disclosure but merely an illustration.

The diaphragm 110 may include one or more springs 304. A particular spring 304 may be held in place within the diaphragm 110 by being secured within one or more cut-outs 306 of a corresponding auxiliary spreader 300. For example, the particular spring 304 may be held in place within the diaphragm 110 by a coil or bend being at least partially passed through a corresponding cut-out 306 of the corresponding auxiliary spreader 300. By way of another example, a particular spring 304 may be coupled to a corresponding auxiliary spreader 300 via one or more fasteners or an adhesive, one or more fabrication processes (e.g., welding processes, or the like), and/or one or more interlocking assemblies (e.g., hook and loop fastener assemblies, tab and groove assemblies, or the like). In this regard, each particular spring 304 is stretched between cut-outs 306 of a corresponding auxiliary spreader 300, such that each auxiliary spreader 300 and spring 304 assembly is a stand-alone or independent assembly within the diaphragm 110 (e.g., as opposed to the complete integrated systems as illustrated in other example embodiments throughout the disclosure).

It is noted herein the one or more springs 304 may include off-the-shelf springs, include springs fabricated from off-the-shelf spring material, or include custom-made/purpose-built springs. Where the one or more springs 304 are custom-made/purpose-built springs, the one or more springs 304 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like. For instance, the bends or coils may be differently-spaced along the length of the cushion 112 to allow for an improved distribution of user weight in the aircraft seat 102.

It is noted herein components including, but not limited to, the one or more auxiliary spreaders 300 and the one or more springs 304 may each be considered support diaphragm components, for purposes of the disclosure.

Figure 4:
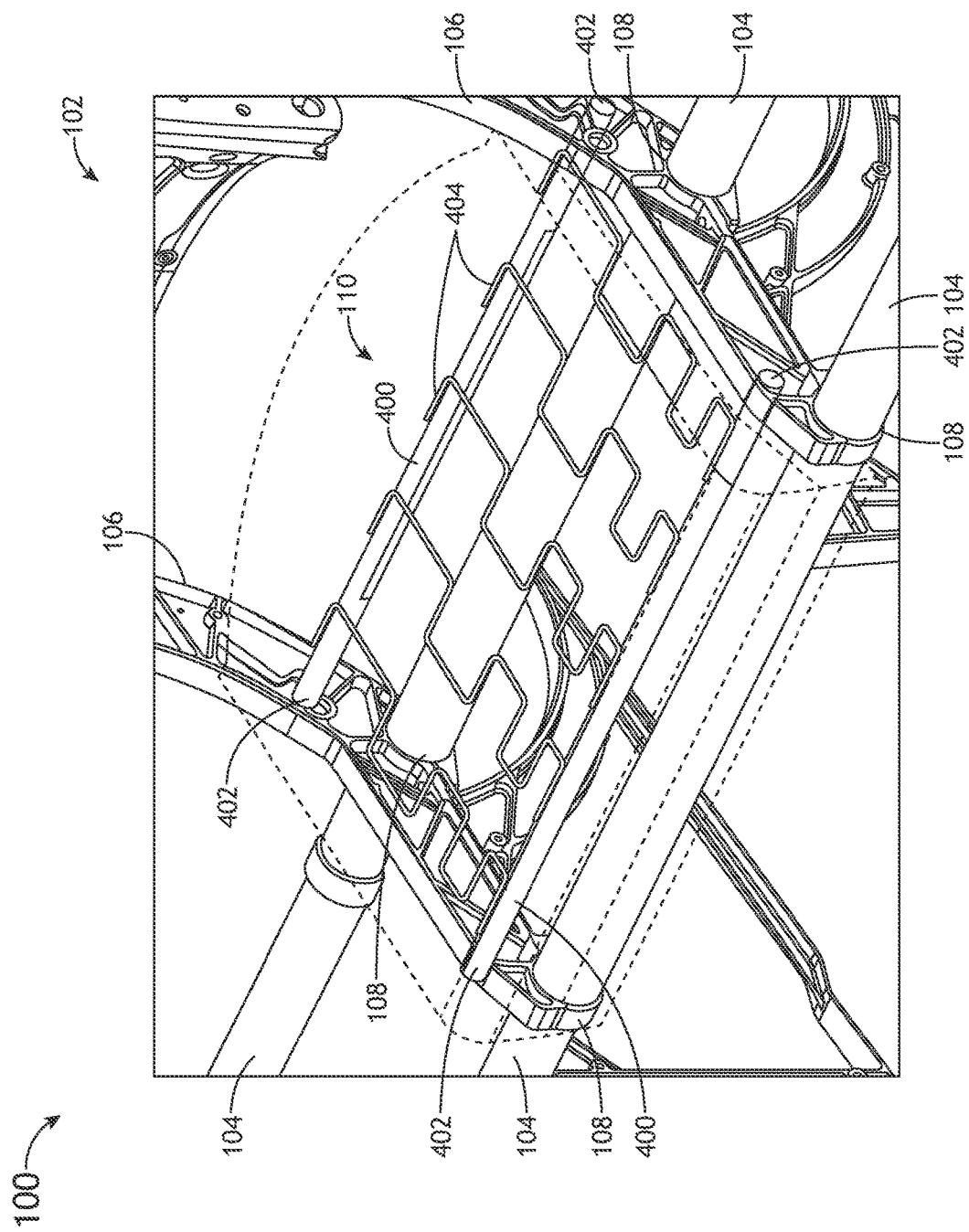
FIG. 4 illustrates a perspective view of portions of an aircraft seat including a spring-based seat diaphragm, in accordance with one or more embodiments of the disclosure.

Referring now to an example embodiment illustrated in FIG. 4, the diaphragm 110 may include one or more auxiliary beams 400. Where there are multiple auxiliary beams 400, the multiple auxiliary beams 400 may be positioned in a parallel (or substantially parallel) spaced-apart relationship. In addition, where there are multiple auxiliary beams 400, a particular auxiliary beam 400 may correspond to a respective "forward/fore" or "aft/rear" auxiliary beam 400. It is noted herein, however, the relationship between the multiple auxiliary beams 400 is not limited to parallel (or substantially parallel), and the arrangement of the multiple auxiliary beams 400 is not limited to respective "forward/fore" and "aft/rear" designations. Therefore, the above description should not be interpreted as a limitation on the present disclosure but merely an illustration.

The one or more auxiliary beams 400 may be coupled to the one or more primary spreaders 106. For example, the one or more auxiliary beams 400 may be coupled to the one or more primary spreaders 106 at one or more coupling locations 402. For instance, the one or more auxiliary beams 400 may be coupled to the one or more primary spreaders 106 with one or more fasteners or an adhesive at the one or more coupling locations 402. In addition, the one or more auxiliary beams 400 may be coupled to the one or more primary spreaders 106 with one or more fabrication processes (e.g., welding processes, or the like) at the one or more coupling locations 402. Further, the one or more auxiliary beams 400 may be coupled to the one or more primary spreaders 106 with one or more interlocking assemblies (e.g., hook and loop fastener assemblies, tab and groove assemblies, or the like) at the one or more coupling locations 402.

The diaphragm 110 may include one or more springs 404. The one or more springs 404 may be coupled to the one or more auxiliary beams 400. For example, the one or more springs 404 may be coupled to the one or more auxiliary beams 400 via one or more fasteners or an adhesive, one or more fabrication processes (e.g., welding processes, or the like), and/or one or more interlocking assemblies (e.g., hook and loop fastener assemblies, tab and groove assemblies, or the like). By way of another example, a coil or bend of a particular spring 404 may wrap around the one or more auxiliary beams 400. In this regard, the one or more springs 404 are stretched between the one or more auxiliary beams 400.

It is noted herein the one or more springs 404 may include off-the-shelf springs, include springs fabricated from off-the-shelf spring material, or include custom-made/purpose-built springs. Where the one or more springs 404 are custom-made/purpose-built springs, the one or more springs 404 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like.

It is noted herein components including, but not limited to, the one or more auxiliary beams 400 and the one or more springs 404 may each be considered support diaphragm components, for purposes of the disclosure.

Figure 5:
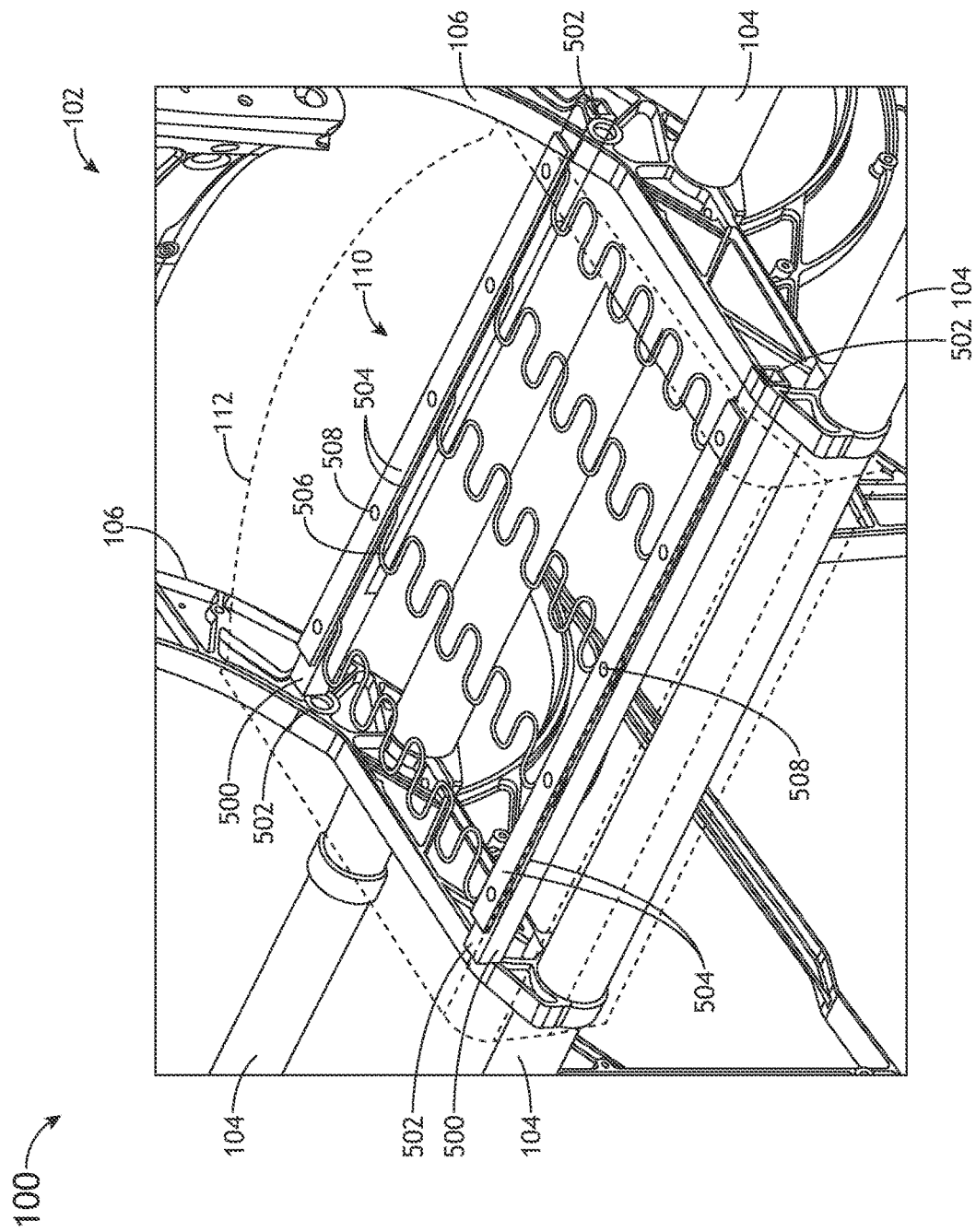
FIG. 5 illustrates a perspective view of portions of an aircraft seat including a spring-based seat diaphragm, in accordance with one or more embodiments of the disclosure.

Referring now to an example embodiment illustrated in FIG. 5, the diaphragm 110 may include one or more auxiliary beams 500. Where there are multiple auxiliary beams 500, the multiple auxiliary beams 500 may be positioned in a parallel (or substantially parallel) spaced-apart relationship. In addition, where there are multiple auxiliary beams 500, a particular auxiliary beam 500 may correspond to a respective "forward/fore" or "aft/rear" auxiliary beam 500. It is noted herein, however, the relationship between the multiple auxiliary beams 500 is not limited to parallel (or substantially parallel), and the arrangement of the multiple auxiliary beams 500 is not limited to respective "forward/fore" and "aft/rear" designations. Therefore, the above description should not be interpreted as a limitation on the present disclosure but merely an illustration.

The one or more auxiliary beams 500 may be coupled to the one or more primary spreaders 106. For example, the one or more auxiliary beams 500 may be coupled to the one or more primary spreaders 106 at one or more coupling locations 502. For instance, the one or more auxiliary beams 500 may be coupled to the one or more primary spreaders 106 with one or more fasteners or an adhesive at the one or more coupling locations 502. In addition, the one or more auxiliary beams 500 may be coupled to the one or more primary spreaders 106 with one or more fabrication processes (e.g., welding processes, or the like) at the one or more coupling locations 502. Further, the one or more auxiliary beams 500 may be coupled to the one or more primary spreaders 106 with one or more interlocking assemblies (e.g., hook and loop fastener assemblies, tab and groove assemblies, or the like) at the one or more coupling locations 502.

The diaphragm 110 may include one or more sets of bars 504. For example, the one or more sets of bars 504 may be coupled to the one or more auxiliary beams 500, as opposed to attaching directly to the one or more primary spreaders 106. Where there are multiple sets of bars 504, the sets of bars 504 may be positioned in a parallel (or substantially parallel) spaced-apart relationship. In addition, where there are multiple sets of bars 504, a particular set of bars 504 may correspond to a respective "forward/fore" or "aft/rear" set of bars 504. The one or more sets of bars 504 may be transverse (e.g., perpendicular (or substantially perpendicular)) to the one or more auxiliary beams 500. It is noted herein, however, the relationship between the multiple set of bars 504 is not limited to parallel (or substantially parallel), the arrangement of the multiple set of bars 504 is not limited to respective "forward/fore" or "aft/rear" designations, and the relationship between the one or more set of bars 504 and the one or more auxiliary beams 500 is not limited to transverse (e.g., perpendicular (or substantially perpendicular)). Therefore, the above description should not be interpreted as a limitation on the present disclosure but merely an illustration.

The diaphragm 110 may include one or more springs 506. A particular spring 506 may be held in place within the diaphragm 110 by being secured by the one or more sets of bars 504. For example, the particular spring 506 may be held in place within the diaphragm 110 by being secured between an upper bar 504 and a lower bar 504 of a particular set of bars 504. By way of another example, the particular spring 506 may be held in place via one or more fasteners 508, either in addition to or instead of the one or more sets of bars 504. For example, a fastener 508 may engage the upper bar 504 and the lower bar 504, and a coil or bend of a particular spring 506 may at least partially wrap around the fastener 508 in the gap between the upper bar 504 and the lower bar 504. It is noted herein, however, the coil or bend of the particular spring 506 may not need to wrap around the fastener 508, where the upper bar 504 and the lower bar 504 are secured tightly enough to pinch the spring 506 and not allow the spring 506 to move within the diaphragm 110. In addition, it is noted herein the one or more springs 506 may be coupled to one or more sets of bars 504 via an adhesive, one or more fabrication processes (e.g., welding processes, or the like), and/or one or more interlocking assemblies (e.g., hook and loop fastener assemblies, tab and groove assemblies, or the like). In this regard, the one or more springs 506 are stretched between the one or more sets of bars 504.

It is noted herein the one or more springs 506 may include off-the-shelf springs, include springs fabricated from off-the-shelf spring material, or include custom-made/purpose-built springs. Where the one or more springs 506 are custom-made/purpose-built springs, the one or more springs 506 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like.

It is noted herein components including, but not limited to, the one or more auxiliary beams 500, the one or more sets of bars 504, and the one or more springs 506 may each be considered support diaphragm components, for purposes of the disclosure.

Figure 6:
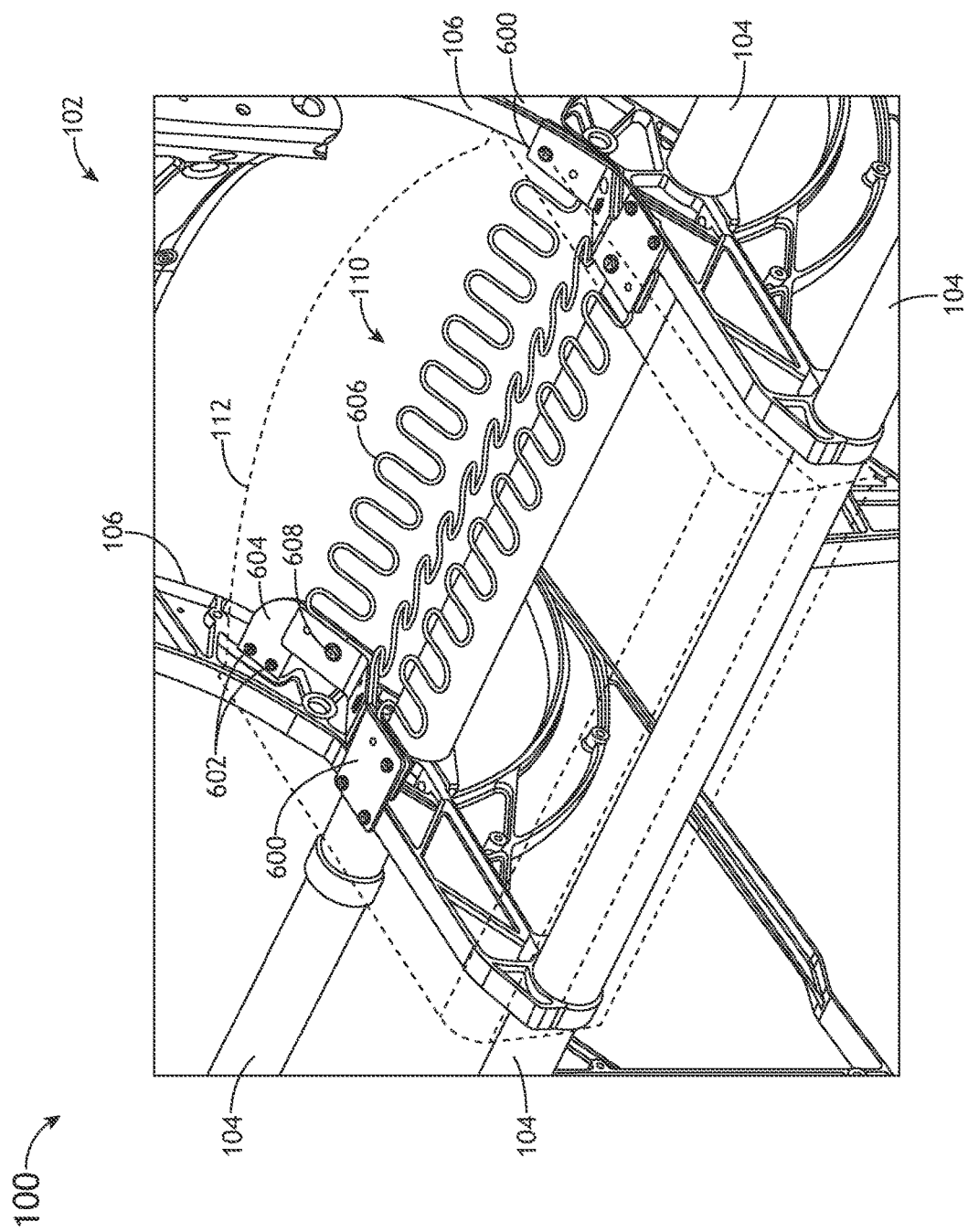
FIG. 6 illustrates a perspective view of portions of an aircraft seat including a spring-based seat diaphragm, in accordance with one or more embodiments of the disclosure.

Referring now to an example embodiment illustrated in FIG. 6, the diaphragm 110 may include one or more lower brackets 600. Where there are multiple lower brackets 600, the multiple lower brackets 600 may be positioned in a parallel (or substantially parallel) spaced-apart relationship. In addition, where there are multiple lower brackets 600, a particular lower bracket 600 may correspond to a respective "inboard" or "outboard" lower bracket 600. The one or more lower brackets 600 may be transverse (e.g., perpendicular (or substantially perpendicular)) to the one or more structural beams 104. It is noted herein, however, the relationship between the multiple lower brackets 600 is not limited to parallel (or substantially parallel), the arrangement of the multiple lower brackets 600 is not limited to respective "inboard" and "outboard" designations, and the relationship between the one or more lower brackets 600 and the one or more structural beams 104 is not limited to transverse (e.g., perpendicular (or substantially perpendicular)). Therefore, the above description should not be interpreted as a limitation on the present disclosure but merely an illustration.

The one or more lower brackets 600 may be coupled to the one or more primary spreaders 106. For example, the one or more lower brackets 600 may be coupled to the one or more primary spreaders 106 at one or more coupling locations 602. For instance, the one or more lower brackets 600 may be coupled to the one or more primary spreaders 106 with one or more fasteners or an adhesive at the one or more coupling locations 602. In addition, the one or more lower brackets 600 may be coupled to the one or more primary spreaders 106 with one or more fabrication processes (e.g., welding processes, or the like) at the one or more coupling locations 602. Further, the one or more lower brackets 600 may be coupled to the one or more primary spreaders 106 with one or more interlocking assemblies (e.g., hook and loop fastener assemblies, tab and groove assemblies, or the like) at the one or more coupling locations 602.

The diaphragm 110 may include one or more sets of upper brackets 604. For example, the one or more sets of upper brackets 604 may be coupled to the one or more lower brackets 600, as opposed to attaching directly to the one or more primary spreaders 106.

The diaphragm 110 may include one or more springs 606. A particular spring 606 may be held in place within the diaphragm 110 by being secured by the one or more lower brackets 600 and/or the one or more sets of upper brackets 604. For example, the particular spring 606 may be held in place within the diaphragm 110 by being secured between a lower bracket 600 and an upper bracket 604. By way of another example, the particular spring 606 may be held in place within the diaphragm 110 by being secured between an upper bracket 604 and a lower upper bracket 604 of a particular set of upper brackets 604. By way of another example, the particular spring 606 may be held in place via one or more fasteners 608, either in addition to or instead of the one or more sets of upper brackets 604. For example, a fastener 608 may engage the lower bracket 600 and the upper bracket 604, and a coil or bend of a particular spring 606 may at least partially wrap around the fastener 608 in the gap between the lower bracket 600 and the upper bracket 604. By way of another example, a fastener 608 may engage the upper bracket 604 and the lower upper bracket 604, and a coil or bend of a particular spring 606 may at least partially wrap around the fastener 608 in the gap between the upper bracket 604 and the lower upper bracket 604. It is noted herein, however, the coil or bend of the particular spring 606 may not need to wrap around the fastener 608, where the upper bracket 604 and the lower upper bracket 604 are secured tightly enough to pinch the spring 606 and not allow the spring 606 to move within the diaphragm 110. In addition, it is noted herein the one or more springs 606 may be coupled to one or more sets of upper brackets 604 via an adhesive, one or more fabrication processes (e.g., welding processes, or the like), and/or one or more interlocking assemblies (e.g., hook and loop fastener assemblies, tab and groove assemblies, or the like). In this regard, the one or more springs 606 are stretched between the one or more lower brackets 600.

It is noted herein the one or more springs 606 may include off-the-shelf springs, include springs fabricated from off-the-shelf spring material, or include custom-made/purpose-built springs. Where the one or more springs 606 are custom-made/purpose-built springs, the one or more springs 606 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like.

It is noted herein components including, but not limited to, the one or more lower brackets 600, the one or more upper brackets 604, and the one or more springs 606 may each be considered support diaphragm components, for purposes of the disclosure.

Figure 7:
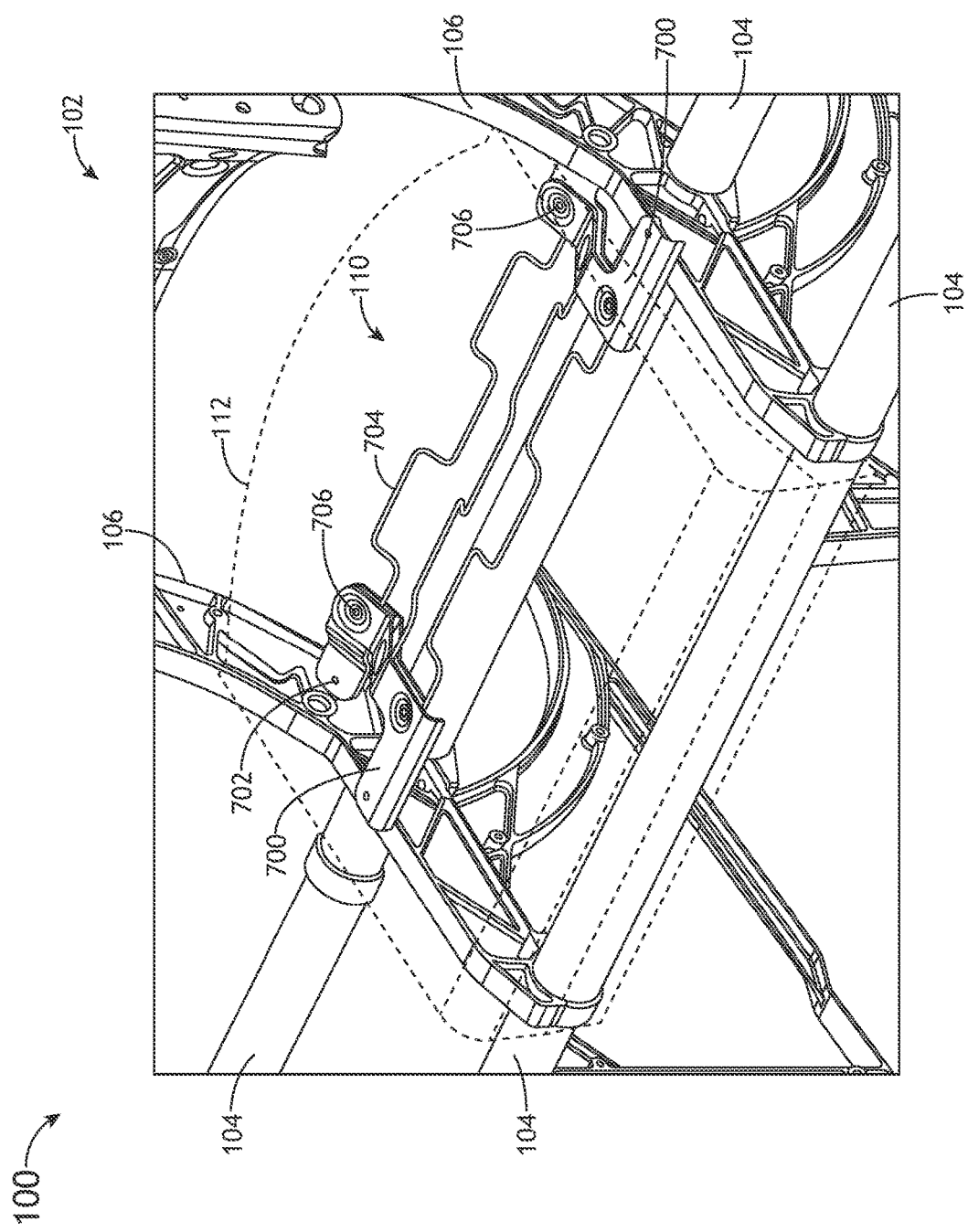
FIG. 7 illustrates a perspective view of portions of an aircraft seat including a spring-based seat diaphragm, in accordance with one or more embodiments of the disclosure.

Referring now to an example embodiment illustrated in FIG. 7, the diaphragm 110 may include one or more brackets 700. Where there are multiple brackets 700, the multiple brackets 700 may be positioned in a parallel (or substantially parallel) spaced-apart relationship. In addition, where there are multiple brackets 700, a particular bracket 700 may correspond to a respective "inboard" or "outboard" bracket 700. The one or more brackets 700 may be transverse (e.g., perpendicular (or substantially perpendicular)) to the one or more structural beams 104. It is noted herein, however, the relationship between the multiple brackets 700 is not limited to parallel (or substantially parallel), the arrangement of the multiple brackets 700 is not limited to respective "inboard" and "outboard" designations, and the relationship between the one or more brackets 700 and the one or more structural beams 104 is not limited to transverse (e.g., perpendicular (or substantially perpendicular)). Therefore, the above description should not be interpreted as a limitation on the present disclosure but merely an illustration.

The one or more brackets 700 may be coupled to the one or more primary spreaders 106. For example, the one or more brackets 700 may be coupled to the one or more primary spreaders 106 at one or more coupling locations 702. For instance, the one or more brackets 700 may be coupled to the one or more primary spreaders 106 with one or more fasteners or an adhesive at the one or more coupling locations 702. In addition, the one or more brackets 700 may be coupled to the one or more primary spreaders 106 with one or more fabrication processes (e.g., welding processes, or the like) at the one or more coupling locations 702. Further, the one or more brackets 700 may be coupled to the one or more primary spreaders 106 with one or more interlocking assemblies (e.g., hook and loop fastener assemblies, tab and groove assemblies, or the like) at the one or more coupling locations 702.

The diaphragm 110 may include one or more springs 704. A particular spring 704 may be held in place within the diaphragm 110 by being secured by the one or more brackets 700. For example, the particular spring 704 may be held in place within the diaphragm 110 at an attachment point 706 on the one or more brackets 700. For instance, the attachment point 706 may be a protrusion or a fabricated portion (e.g., a crimped portion, a bent portion, or the like) on the one or more brackets 700. In addition, the attachment point may be configured to receive one or more fasteners, where a fastener may pass through the bracket 700 at the attachment point 706 and a coil or bend of a particular spring 704 may at least partially wrap around the fastener in the gap within the bracket 700. It is noted herein, however, the coil or bend of the particular spring 704 may not need to wrap around the fastener, where the gap within the bracket 700 is dimensioned to pinch the spring 704 and not allow the spring 704 to move within the diaphragm 110. In addition, it is noted herein the one or more springs 704 may be coupled to the one or more brackets 700 via a fabricated component of the one or more brackets 700, an adhesive, one or more fabrication processes (e.g., welding processes, or the like), and/or one or more interlocking assemblies (e.g., hook and loop fastener assemblies, tab and groove assemblies, or the like). In this regard, the one or more springs 704 are stretched between the one or more brackets 700.

It is noted herein the one or more springs 704 may include off-the-shelf springs, include springs fabricated from off-the-shelf spring material, or include custom-made/purpose-built springs. Where the one or more springs 704 are custom-made/purpose-built springs, the one or more springs 704 may be tuned with modeling or simulation software or algorithms (e.g., via finite element analysis modeling or simulation software or algorithms). For example, the fine-tuning may include, but is not limited to, spacing between bends or coils, diameter of bends or coils, shape of bend or coil (e.g., tracing a sine wave, square wave, or the like), angle of springs relative to one or more planes defined within the diaphragm 110 (e.g., set within a single plane (being co-planar), multiple intersection planes, or the like), or the like.

It is noted herein components including, but not limited to, the one or more brackets 700 and the one or more springs 704 may each be considered support diaphragm components, for purposes of the disclosure.

Figure 8:
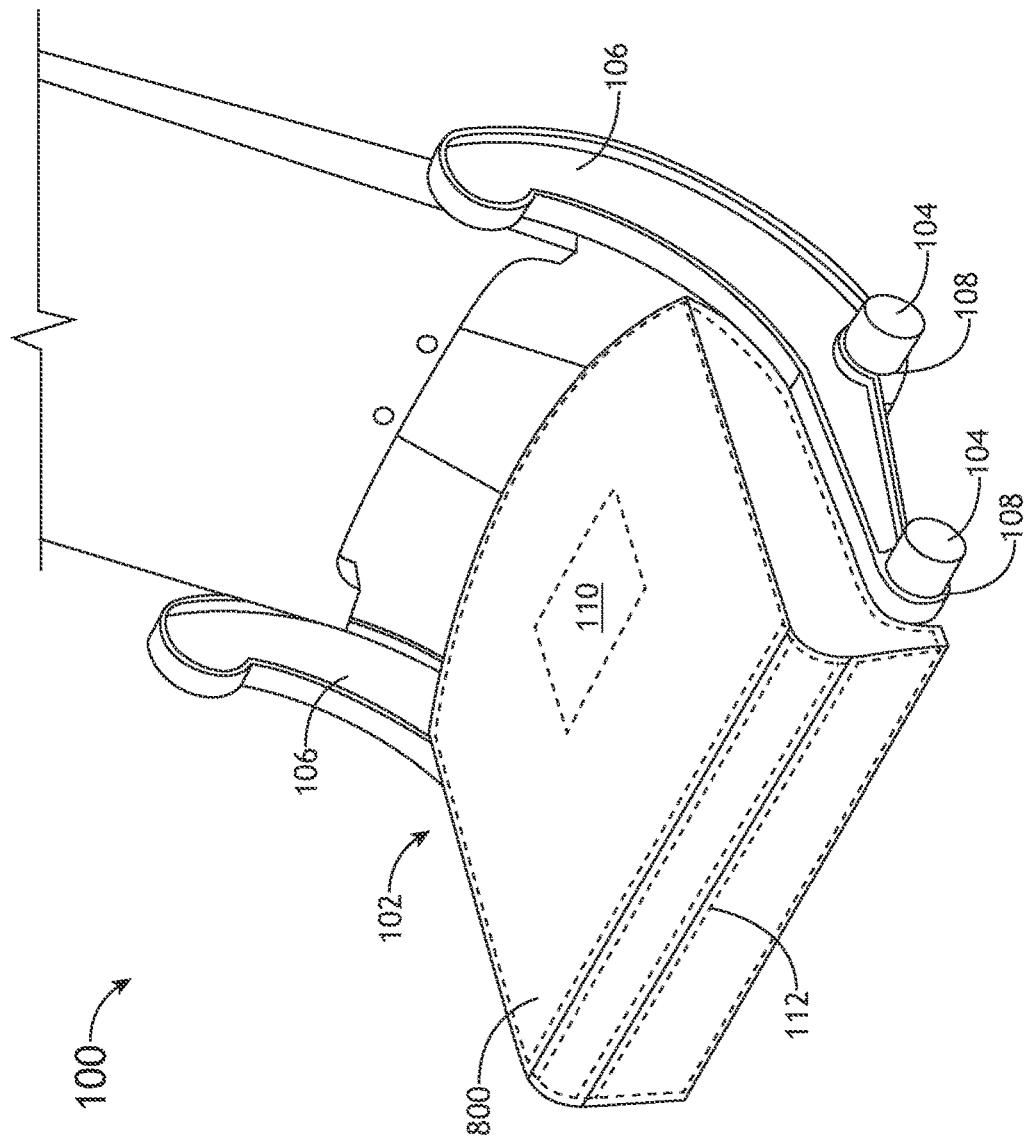
FIG. 8 illustrates a perspective view of portions of an aircraft seat including a spring-based seat diaphragm, in accordance with one or more embodiments of the disclosure.

FIG. 8 illustrates an aircraft seat 102 including the spring-based seat diaphragm 110, in accordance with one or more embodiments of the disclosure.

The diaphragm 110 may be mounted to the one or more structural beams 104. The diaphragm 110 may be positioned within the one or more primary spreaders 106.

The aircraft seat 102 may include the cushion 112. The diaphragm 110 may support the cushion 112. For example, the cushion 112 may be supported by the diaphragm 110 and at least some of the one or more structural beams 104. For instance, the diaphragm 110 may be positioned within the one or more primary spreaders 106 and configured to support an aft portion of the cushion 112, while a fore location of the cushion 112 may be supported by a fore structural beam 104. By way of another example, the cushion 112 may be supported by the diaphragm 110, at least some of the one or more structural beams 104, and at least some of the one or more primary spreaders 106. In this regard, the cushion 112 may be arranged in a hybrid setup that is supported by both the diaphragm 110 and portions of the structural beams 104 and/or portions of the one or more primary spreaders 106.

The aircraft seat 102 may include a dress cover 800. The dress cover 800 may cover at least a portion of the cushion 112. For example, the dress cover 800 may be configured to wrap around or otherwise enclose exterior surfaces of the cushion 112 not proximate to the support system. The dress cover 800 may be attached to one or more components of the aircraft seat 102. For example, the one or more components may include, but not limited to, the cushion 112 or the diaphragm 110. By way of another example, the dress cover 800 and the one or more components of the aircraft seat 102 may be coupled with hook and loop fastener assemblies (e.g., Velcro®) or other fastener assemblies (e.g., attachment clips, or the like). Where multiple hook and loop fastener assemblies are used, the aircraft seat 102 may include multiple attachment interfaces. For example, a first set of hook and loop fastener assemblies may be sewn into/onto the dress cover 800 and the cushion 112, while a second set of hook and loop fastener assemblies may be located between the cushion 112 and the diaphragm 110.

Additional systems and methods for attaching the dress cover 800 to components of the aircraft seat 102 including, but not limited to, the cushion 112 or the diaphragm 110 are discussed in U.S. patent application Ser. No. 17/008,296, titled ATTACHMENT ASSEMBLY FOR A DRESS COVER AND CUSHION OF AN AIRCRAFT SEAT, filed Aug. 31, 2020, previously incorporated herein in the entirety.

It is noted herein any of the example embodiments illustrated in FIGS. 1-7 may be installed within the aircraft seat 102 including the dress cover 800.

It is noted herein the diaphragm 110 may be configured to work with any aircraft seat 102 and/or any set of components in the aircraft seat 102. For example, the diaphragm 110 may be configured to take into account any changes in shape (e.g., within the x-y plane) of the components of the aircraft seat 102, where the changes in shape may be caused by or otherwise dependent on the location of the aircraft seat 102 within the aircraft cabin.

Although embodiments of the disclosure illustrate the diaphragm 110 being integrated within the aircraft seat 102, it is noted herein, however, that the diaphragm 110 and/or components of the diaphragm 110 are not limited to the aviation environment and/or the aircraft components within the aviation environment. For example, the diaphragm 110 and/or components of the diaphragm 110 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the diaphragm 110 and/or components of the diaphragm 110 may be configured for commercial or industrial use in either a home or a business. Therefore, the above description should not be interpreted as a limitation on the present disclosure but merely an illustration.

In this regard, the spring-based seat diaphragm 110 includes off-the-shelf springs, includes springs fabricated from off-the-shelf spring material, and/or includes custom-made/purpose-built springs. The spring-based seat diaphragm 110 supports the cushion 112, in addition to portions of the frame (e.g., structural beams 104, or the like) supporting the cushion 112. The spring-based seat diaphragm 110 should be mounted to and/or positioned within the frame (e.g., within the structural beams 104) in an aft-most part of the vehicle seat, the aft-most part of the vehicle seat being a location selected to improve comfort and longevity of the vehicle seat through user weight distribution. Where the vehicle seat is an aircraft seat 102, the spring-based seat diaphragm is configured in accordance with aviation guidelines and/or standards Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A spring-based seat diaphragm for an aircraft seat, comprising:

at least one auxiliary spreader, the at least one auxiliary spreader configured to be transversely coupled to a first structural beam and a second structural beam, the at least one auxiliary spreader configured to be positioned between a first primary spreader and a second primary spreader, the first primary spreader and the second primary spreader configured to be parallel to the at least one auxiliary spreader, the first primary spreader and the second primary spreader configured to be transversely coupled to the first structural beam and the second structural beam;

at least one spring, the at least one spring being proximate to the at least one auxiliary spreader, the at least one spring being parallel to the at least one auxiliary spreader, the at least one spring configured to be positioned between the first primary spreader and the second primary spreader, the at least one spring including a plurality of bends configured to distribute user weight applied to a cushion installed on the aircraft seat over the spring-based seat diaphragm; and a first set of bars and a second set of bars, the first set of bars and the second set of bars configured to be positioned between the first primary spreader and the second primary spreader, the first set of bars being transversely coupled to a first end of the at least one auxiliary spreader, the second set of bars being transversely coupled to a second end of the at least one auxiliary spreader, the first set of bars and the second set of bars being configured to secure the at least one spring within the spring-based seat diaphragm, the spring-based seat diaphragm being configured to support an aft portion of the cushion, the first structural beam being configured to support a forward portion of the cushion.

2. The spring-based seat diaphragm of claim 1, the first set of bars including an upper bar and a lower bar, a first bend of the plurality of bends at a first end of the at least one spring being configured to fit within a space between the upper bar and the lower bar of the first set of bars, the second set of bars including an upper bar and a lower bar, a second bend of the plurality of bends at a second end of the at least one spring being configured to fit within a space between the upper bar and the lower bar of the second set of bars.

3. The spring-based seat diaphragm of claim 1, the at least one auxiliary spreader being configured to couple to each of the first structural beam and the second structural beam via an interference coupler.

4. A spring-based seat diaphragm for an aircraft seat, comprising:

at least one support diaphragm component, the at least one support diaphragm component configured to be transversely coupled to a first structural beam and a second structural beam; and at least one spring, the at least one spring being proximate to the at least one support diaphragm component, the at least one spring configured to be positioned transverse to the at least one support diaphragm component between a first primary spreader and a second primary spreader, the at least one spring including a plurality of bends configured to distribute user weight applied to a cushion installed on the aircraft seat over the spring-based seat diaphragm, the at least one support diaphragm component comprising:

a first auxiliary beam and a second auxiliary beam, the first auxiliary beam and the second auxiliary beam configured to be parallel to the first structural beam and the second structural beam;

a first set of bars, the first set of bars configured to be positioned between the first primary spreader and the second primary spreader, the first set of bars being transversely coupled to a first end of the first auxiliary beam; and a second set of bars, the second set of bars configured to be positioned between the first primary spreader and the second primary spreader, the second set of bars being transversely coupled to a second end of the second auxiliary beam, the first set of bars and the second set of bars being configured to secure the at least one spring within the spring-based seat diaphragm, the spring-based seat diaphragm being configured to support an aft portion of the cushion, the first structural beam being configured to support a forward portion of the cushion.

5. The spring-based seat diaphragm of claim 4, the first set of bars including an upper bar and a lower bar, a first bend of the plurality of bends at the first end of the at least one spring may be configured to fit within a space between the upper bar and the lower bar of the first set of bars, the second set of bars including an upper bar and a lower bar, a second bend of the plurality of bends at the second end of the at least one spring being configured to fit within a space between the upper bar and the lower bar of the second set of bars.

* * * * *